May 29, 1956 J. NEWCOMBE ET AL 2,748,080
SECONDARY RECOVERY OF PETROLEUM BY WATER FLOODING
Filed March 2, 1953 2 Sheets-Sheet 1
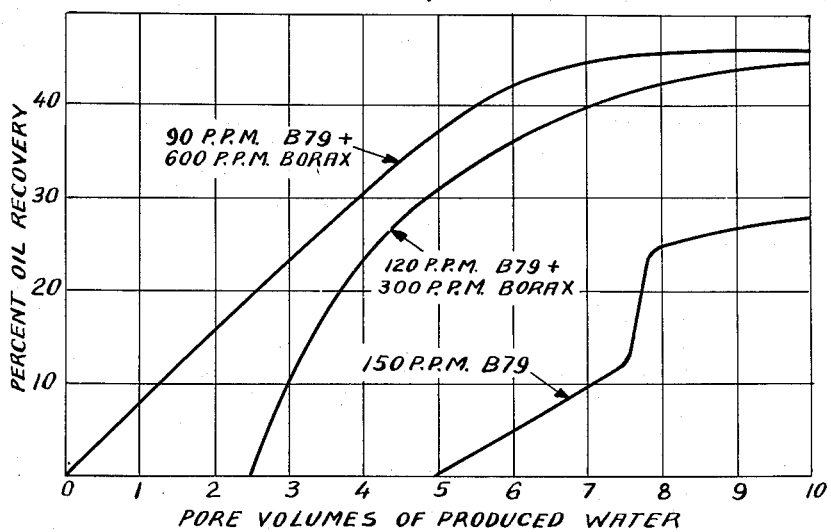
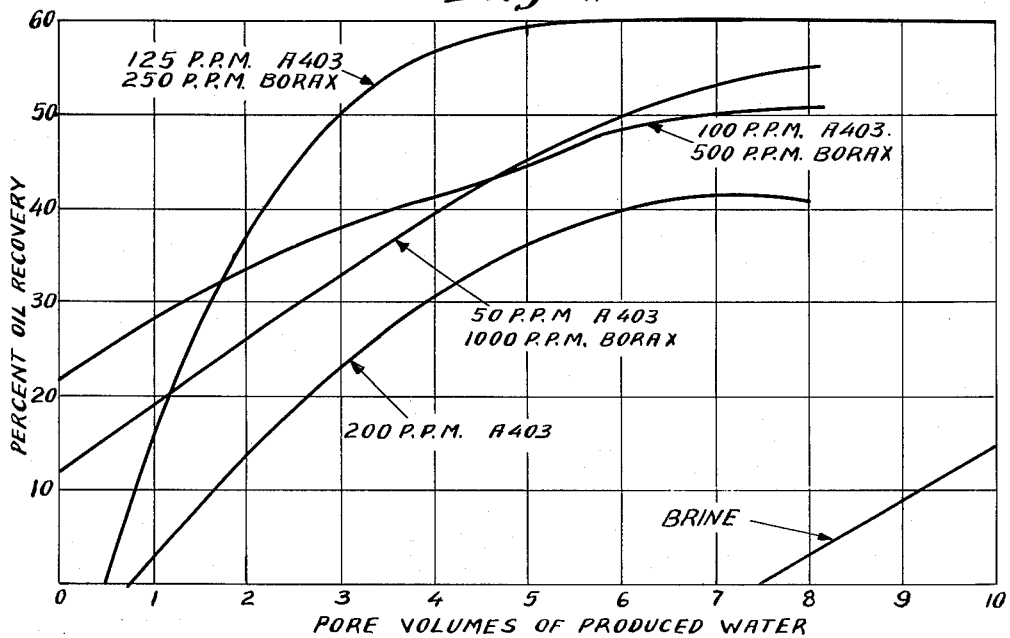
INVENTORS.
Jack Newcombe
Jerry Doane
BY
ATTORNEY.

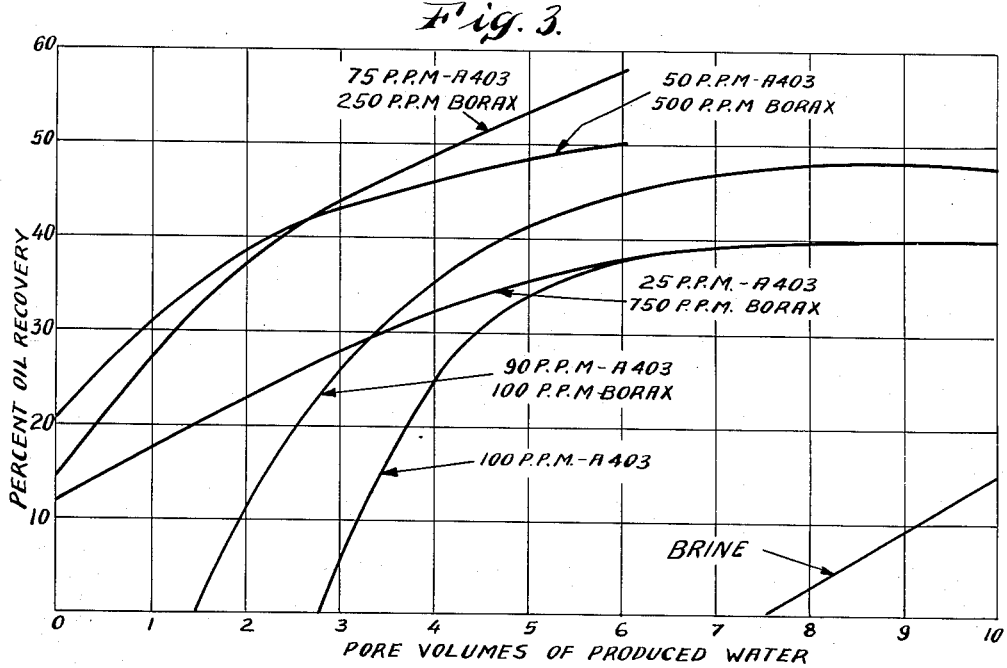
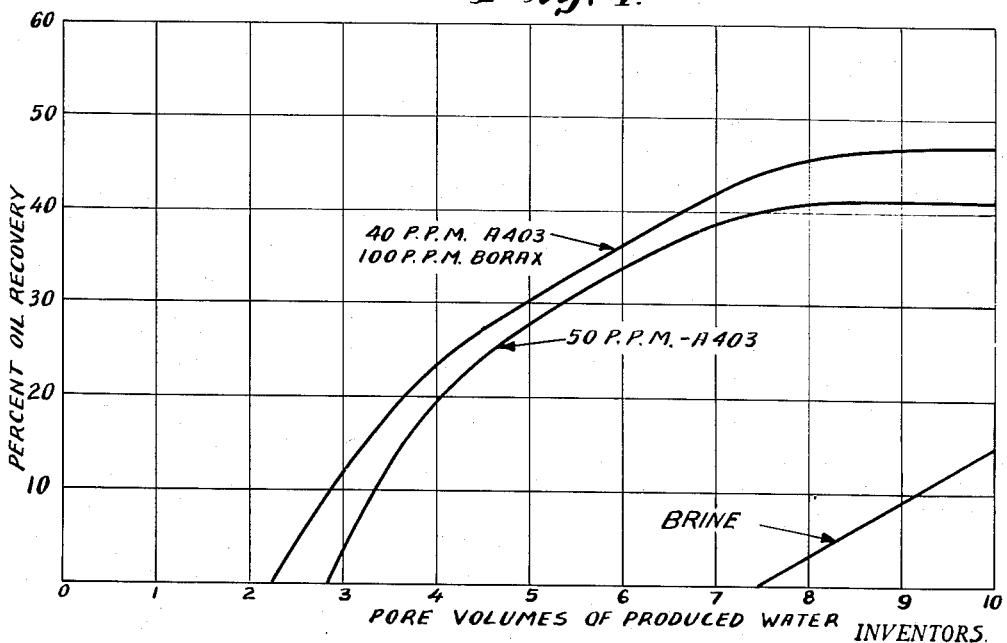

United States Patent Office 2,748,080
Patented May 29, 1956

2,748,080

SECONDARY RECOVERY OF PETROLEUM BY WATER FLOODING

Jack Newcombe and Jerry D. Doane, Pawhuska, Okla., assignors to Cities Service Research and Development Company, New York, N. Y., a corporation of New Jersey Application March 2, 1953, Serial No. 339,526

5 Claims. (Cl. 252—8.55)

This invention relates to methods of secondary recovery of petroleum from depleted reservoirs, and more particularly to methods of recovery by water-flooding operations.

As is well known to the art, when an oil reservoir has been depleted to a point where it is no longer profitable to produce oil by pumping operations, as much as 50% or more of the oil originally in place may remain in the reservoir as an oil film covering the sand particles of the producing formation. Many methods have been proposed in the past for the recovery of a part of this residual oil, such as water flooding or gas or air repressuring, which have had some degree of success, but recovers by these methods still leave a large proportion of the oil in the reservoir.

More recently it has been proposed that surface active agents, or surfactants, be added to the flood water, in water flooding operations, to displace the oil from the sand particles, and to allow the sand to be preferentially wet by the injected water. Nonionic compounds are best suited for oil recovery, since they are chemically inert, whereas anionic and cationic compounds either tend to react with components of the well brine to form precipitates which plug the formation or are adsorbed on the formation to a degree which renders them unusable. Even nonionic surfactants are strongly adsorbed by the formation sand, and in order to maintain a sufficient concentration of surfactant at the water flood-oil interface, either the water pumped into the formation must contain an undesirably large proportion of surfactant, or many pore volumes of water must be pumped through the formation before surfactant can be detected in the produced brine, indicating that surfactant has been brought in contact with as much of the formation as possible.

We have now discovered that if surfactant-borax mixtures are employed, earlier oil production due to flooding may be obtained, and more oil may be recovered after equivalent amounts of water have been pumped through the formation than when using surfactants alone, at an equivalent cost per barrel of input fluid. Passage of surfactant through the formation is promoted by the borax, but the increased efficiency of the surfactant-borax flood would appear to be due, at least in part, to increase mobility of the oil when in contact with the aqueous borax-surfactant solution.

In demonstrating our invention an apparatus was set up to simulate conditions in a depleted oil reservoir. This apparatus consisted of a glass column 22¾ by ⅝ inches, and of 120 milliliters capacity, packed with silica sand, the port volume of the sand, after packing, being 48 ml. In testing, 10 ml. of crude oil is introduced to the top of the column, and allowed to percolate through the sand. After allowing the column to stand for 24 hours, water is introduced at the bottom of the column and is forced upwardly through the sand at a rate low enough that no channeling takes place. Passage of the surfactant through the column is determined by checking the surface tension of the produced water. In all test runs on surfactants check runs were made with water containing no added material.

Results of a series of tests using a non-ionic surfactant sold commercially as "Synthetics B79" by the Hercules Powder Company, together with varying amounts of borax, is shown in the following table, the data from which is also shown in graphic form in Fig. 1 of the accompanying drawing. "Synthetics B79" is an alkyl phenol having an alkyl side chain of 8 or 9 carbon atoms, which has been oxyethylated with about 10 mols of ethylene oxide per mol of phenol. The relative quantities of borax and surfactant were chosen to give a composition having equal cost per barrel of input fluid in each run. In this series of tests no oil was produced by ten pore volumes of water containing no additive.

Table I

| | | | |
|---|---|---|---|
| Concentration of B79, p. p. m. | 150 | 120 | 90 |
| Concentration of Borax, p. p. m.[1] | 0 | 300 | 600 |
| Surfactant Cost Equivalent | 150 | 150 | 150 |
| Percent Oil Recovery: | | | |
| Initial Water Production | 0 | 0 | 0 |
| 0.5 Pore Volume Produced Water | 0 | 0 | 5 |
| 1.0 Pore Volume Produced Water | 0 | 0 | 9 |
| 2.0 Pore Volume Produced Water | 0 | 0 | 15 |
| 3.0 Pore Volume Produced Water | 0 | 10 | 24 |
| 4.0 Pore Volume Produced Water | 0 | 24 | 30 |
| 5.0 Pore Volume Produced Water | 0 | 32 | 36 |
| 6.0 Pore Volume Produced Water | 5 | 35 | 40 |
| 8.0 Pore Volume Produced Water | 25 | 44 | 45 |
| 10.0 Pore Volume Produced Water | 28 | 45 | 46 |
| Pore Volume Water Produced when Surfactant found in produced water | 6.0–6.5 | 3.0–3.5 | 4.0–4.5 |

[1] Concentrations of borax are given on the basis of the anhydrous salt

It will be seen, that while a water flood containing surfactant alone does produce oil not recoverable by straight water flood, the oil production, both in point of time of initial production and in total production, is far greater for the compositions in which a part of the surfactant is replaced by borax.

Results of a further series of tests is presented in the following table, and graphically in Figs. 2, 3 and 4 of the attached drawing. The surfactant used in these tests was a nonyl phenol which had been oxyethylated with 30 mols of ethylene oxide, and which is sold commercially by General Aniline and Film Co. under the name "Antarox A–403."

Table II

| | | | | |
|---|---|---|---|---|
| Concentration of A–403, p. p. m. | 500 | 200 | 125 | 100 |
| Concentration of Borax | 0 | 0 | 250 | 500 |
| Surfactant Cost Equivalent | 500 | 200 | 150 | 150 |
| Percent Oil Recovery: | | | | |
| Initial Water Production | 15 | 0 | 0 | 22 |
| 2 Pore Volume Produced Water | 35 | 14 | 37 | 34 |
| 4 Pore Volume Produced Water | 43 | 30 | 57 | 41 |
| 6 Pore Volume Produced Water | 45 | 40 | 60 | 49 |
| 8 Pore Volume Produced Water | | 41 | 60 | 51 |
| 10 Pore Volume Produced Water | | | 60 | |
| Pore Volume Water Produced when Surfactant found in produced water | 0–0.5 | 1.0–1.5 | 1.0–1.5 | 1.0–1.5 |
| Concentration of A–403, p. p. m. | 50 | 100 | 90 | 75 |
| Concentration of Borax | 1,000 | 0 | 100 | 250 |
| Surfactant Cost Equivalent | 150 | 100 | 100 | 100 |
| Percent Oil Recovery: | | | | |
| Initial Water Production | 12 | 0 | 0 | 15 |
| 2 Pore Volume Produced Water | 25 | 0 | 12 | 38 |
| 4 Pore Volume Produced Water | 40 | 25 | 36 | 49 |
| 6 Pore Volume Produced Water | 50 | 38 | 45 | 58 |
| 8 Pore Volume Produced Water | 55 | 39 | 48 | |
| 10 Pore Volume Produced Water | 55 | 40 | 48 | |
| Pore Volume Water Produced when Surfactant found in produced water | 2.5–3.0 | 2.0–2.5 | 2.0–2.5 | 1.5–2.0 |

Table II.—Continued

| | | | | |
|---|---|---|---|---|
| Concentration of A-403, p. p. m. | 50 | 25 | 50 | 40 |
| Concentration of Borax | 500 | 750 | 0 | 100 |
| Surfactant Cost Equivalent | 100 | 100 | 50 | 50 |
| Percent Oil Recovery: | | | | |
| Initial Water Production | 21 | 12 | 0 | 0 |
| 2 Pore Volume Produced Water | 39 | 23 | 0 | 0 |
| 4 Pore Volume Produced Water | 46 | 32 | 20 | 24 |
| 6 Pore Volume Produced Water | 50 | 38 | 34 | 35 |
| 8 Pore Volume Produced Water | | | 41 | 46 |
| 10 Pore Volume Produced Water | | | 41 | 47 |
| Pore Volume Water Produced when Surfactant found in produced water | 1.5–2.0 | 3.5–4.0 | 3.0–3.5 | 2.5–3.0 |

It will be noted from the foregoing that the maximum oil recovery using surfactant alone in quantities up to 200 p. p. m. was only 41 percent, and increasing the amount to 500 p. p. m. increased oil recovery to only 45 percent. When borax is used in conjunction with the surfactant, we have found that recoveries up to 60 percent may be obtained, at the same treating cost as when using but 150 p. p. m. of straight surfactant. It will be further noted that best results are obtained when the borax to surfactant ratio is from about 2:1 to about 7:1, although some improvement is noted at even higher ratios. The decreased efficiency of the flooding operations at the higher ratios is strong evidence that the increased efficiency at our preferred ratios is not due to the cumulative effect of increasing the total amount of additive, since the higher the ratio the greater is the total amount added to the input water. To the contrary, the increased efficiency must be attributed to a hitherto unobserved synergistic effect exhibited by our preferred surfactant-borax mixtures.

The exact manner in which the borax functions to promote oil recovery is not known, but is believed that it may act as a desorbing agent to prevent adsorption of surfactant by the sand, and thus to maintain a higher concentration of surfactant at the water-oil interface.

Having now described our invention, what is claimed is:

1. The process of recovering oil from oil reservoirs which consists in flooding the reservoir with an aqueous liquid comprising from about 40 to about 125 parts per million of a non-ionic surfactant and from about 100 to about 1000 parts per million of borax.

2. The process according to claim 1 in which the surfactant is an alkyl phenol which has been reacted with from about 10 to about 30 mols of ethylene oxide.

3. The process of recovering oil from oil reservoirs which consists of flooding the reservoir with an aqueous liquid comprising from about 40 to about 125 parts per million of non-ionic surfactant and borax, the weight proportion of borax to surfactant being from about 2:1 to about 7:1.

4. The process according to claim 3 in which the surfactant is an alkyl phenol which has been reacted with from about 10 to about 30 mols of ethylene oxide.

5. The process according to claim 4, in which the surfactant is nonyl phenol.

References Cited in the file of this patent

UNITED STATES PATENTS

| | | |
|---|---|---|
| 2,233,381 | De Groote et al. | Feb. 25, 1941 |
| 2,246,726 | Garrison | June 24, 1941 |
| 2,623,856 | Sanders | Dec. 30, 1952 |

FOREIGN PATENTS

| | | |
|---|---|---|
| 163,519 | Great Britain | May 26, 1921 |